ISAAC KENNEDY, OF BINGHAMTON, NEW YORK.

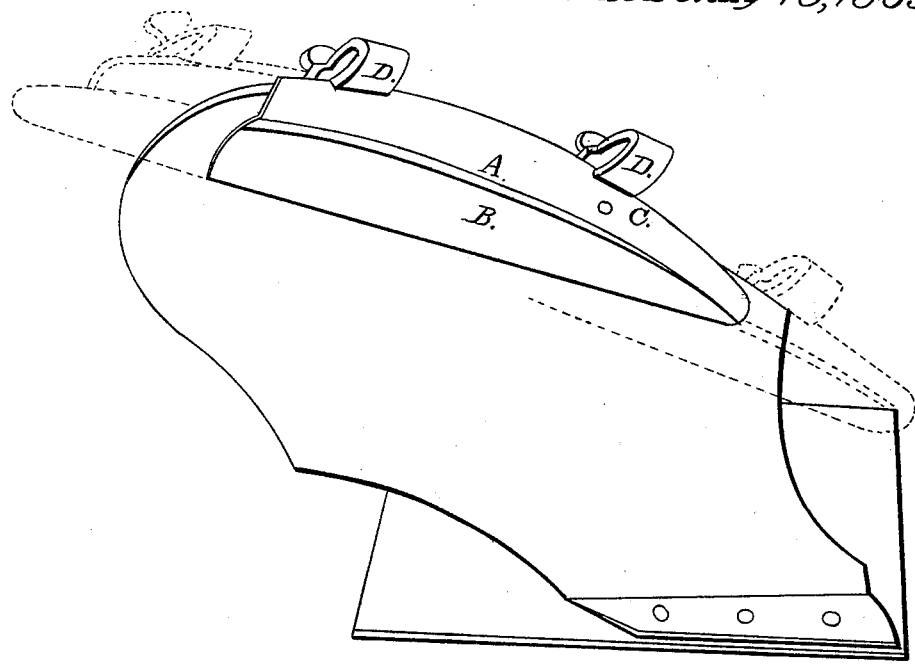
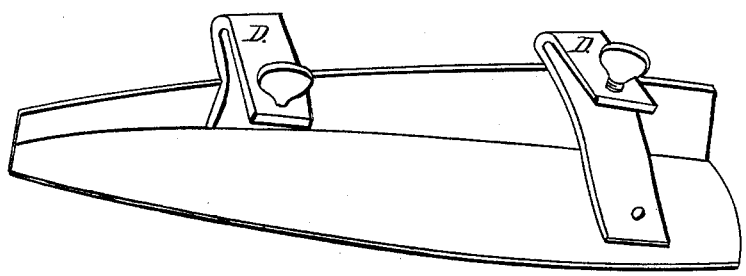

Letters Patent No. 90,271, dated May 18, 1869.

IMPROVEMENT IN PLOWS.

The Schedule referred to in these Letters Patent and making part of the same.

*To all whom it may concern:*

Be it known that I, ISAAC KENNEDY, of Binghamton, in the county of Broome, and State of New York, have invented a new and improved Supplementary Mould-Board for Plows; and I do hereby declare that the following is a full and exact description thereof, reference being had to the accompanying drawings, and to the letters marked thereon.

Figure 1 is a view of the mould-board of a plow, with my improvement attached.

Figure 2 represents it detached, in an inverted position, showing the manner of attaching it to the board.

The nature of my invention consists in providing the upper part of a mould-board for plows with a supplementary adjustable mould-board, which may be readily applied and adjusted, for the purpose of more effectively controlling the operation of turning the furrow, whereby the plow may be adapted to any soil and adjusted to turn different widths of furrows.

I construct my supplementary board A with a curved face, B, corresponding with that of the mould-board of the plow, with a flange, C, which inclines it over from the landside, for the purpose of giving a more abrupt turn to the furrow, so that when the soil is shallow, the piece may be placed lower on the mould-board, thereby turning a perfect furrow.

I attach my improvement to the mould-board of the plow by means of clamps D D and thumb-screws, whereby it may be adjusted to any position required, as represented by the dotted lines in the drawings.

If the soil should be deep and loose, and a narrow furrow is required, I move the plate forward and down, and *vice versa*

For wide furrows, I raise the plate, and place it back to the heel of the mould-board.

Having thus described my invention,

What I claim, and desire to secure by Letters Patent, is—

The supplementary mould-board A, attached to the mould-board of the plow, by means of the clamp D D and thumb-screws, or their equivalents, substantially as herein described, and as essential for the purposes set forth.

ISAAC KENNEDY.

Witnesses:
  H. W. BRADLEY,
  S. W. ROGERS.